Aug. 25, 1970  D. SPAHRBIER ET AL  3,525,643
PROCESS FOR PRODUCING ELECTRICAL ENERGY IN A FUEL CELL
Filed April 13, 1966  4 Sheets-Sheet 2
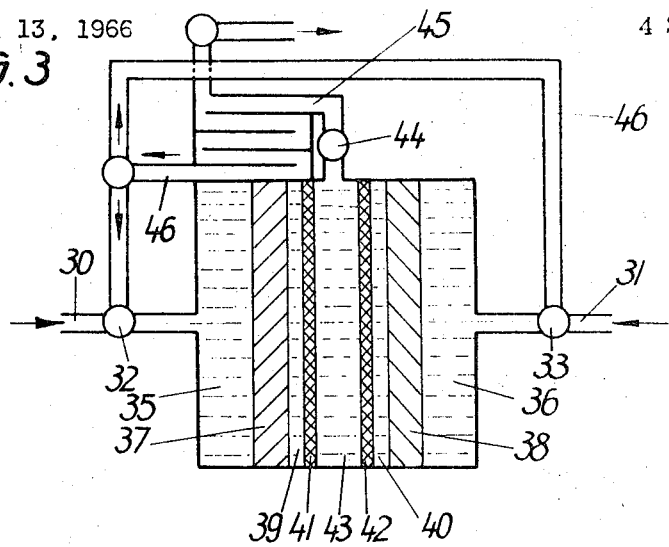
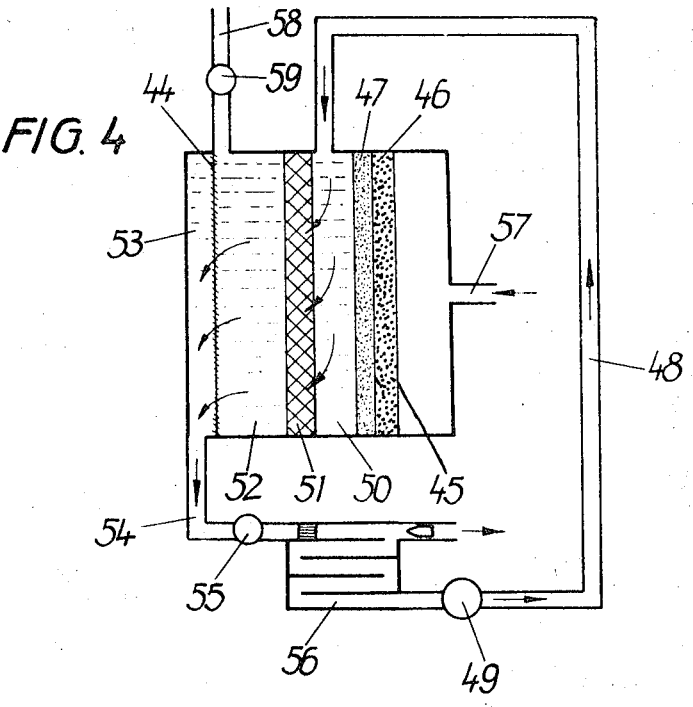
INVENTORS.
DIETER SPAHRBIER
GUENTHER RYHINER, DECEASED
BY ANITA RYHINER, SOLE
EXECUTRIX
BY Gerard J. Weiser
ATTORNEY.

Aug. 25, 1970  D. SPAHRBIER ET AL  3,525,643
PROCESS FOR PRODUCING ELECTRICAL ENERGY IN A FUEL CELL
Filed April 13, 1966  4 Sheets-Sheet 4

INVENTORS.
DIETER SPAHRBIER
GUENTHER RYHINER, DECEASED
BY ANITA RYHINER, SOLE EXECUTRIX
BY
ATTORNEY.

United States Patent Office 3,525,643
Patented Aug. 25, 1970

3,525,643
PROCESS FOR PRODUCING ELECTRICAL ENERGY IN A FUEL CELL
Dieter Spahrbier, Frankfurt am Main, Germany, Guenther Ryhiner, deceased, late of Bad Soden im Taunus, Germany, by Anita Ryhiner, sole executrix, Bad Soden im Taunus, Germany, assignors to Varta Aktiengesellschaft, Frankfurt am Main, Germany, a corporation of Germany
Filed Apr. 13, 1966, Ser. No. 542,358
Int. Cl. H01m 27/14
U.S. Cl. 136—86                                    15 Claims

ABSTRACT OF THE DISCLOSURE

A process for producing electrical energy in a fuel cell. A single stream of electrolyte is supplied to a fuel cell including a pair of porous separation walls. Also substantially all the electrolyte is removed only from the electrode chambers.

---

The present invention relates to an electro-chemical process such as fuel cells, more particularly to a process for the improved operations of such fuel cells. The invention also relates to the apparatus for the use of such a process. The invention provides a process in which reactants are converted to electrical energy while minimizing undesirable reactions of such reactants without conversion to electrical energy. The process also while maximizing conversion to electrical energy minimizes the further undesirable reaction of reaction products obtained during the principal conversion of the organic compounds to electrical energy. The process provides to such ends a certain arrangement or movement of electrolyte within the conversion device.

Fuel cells are now well known in the art. Essentially a fuel cell comprises a fuel electrode chamber, an electrolyte chamber and an air electrode chamber, there chambers being separated, respectively, by a fuel electrode and an air electrode. A plurality of fuel cells may be connected in series and/or parallel so as to form a compact fuel cell pack.

Fuel cells wherein gaseous fuel and/or gaseous oxidizing agent are used, operate usually by supplying the fuel and/or oxidizing agent directly to the porous electrodes in such a manner that a current-producing three-phase boundary between the gaseous reactant, the liquid electrolyte and the solid catalyst, is formed within the pores of the electrodes.

Suitable electrodes for use in this invention are known, in particular gas diffusion electrodes, such as those of Justi et al. as disclosed in U.S. Pat. No. 2,928,891 and others discussed in Fuel Cells vol. 2, George Young (Rheinhold Pub. Co.) 1963. Moreover, there can be used catalyst suspension electrode as described, for instance by H. Gerischer in Ber. Bunsengesellschaft; Phys, Chem. 67, 164, 1963. These catalyst suspension electrodes are used by suspending the catalytic particles in the electrolyte and dissolving the fuel (gaseous or solid or liquid) in the electrolyte of the anode compartment; the oxidizing agent is provided, e.g. dissolved in the electrolyte of the cathode compartment. There can be used the typical liquid reactant fuels such as methanol, ammonia, glycol, etc., carbon monoxide, hydrocarbons like methane, ethane, propane, isooctane, isobutane; and hydrogen peroxide as the oxidizing agent. Gases such as oxygen can be dissolved in the electrolytes by use of the necessary pressure, usually a few atmospheres. Also, catalyst sieve electrodes can also be used in the process of the invention. For practical use, however, fuel cells in which liquid fuel and/or liquid oxidizing agent is supplied to solid electrodes are also of special interest. The liquid fuel and/or the liquid oxidizing agent can be supplied to the electrode in the same manner as gaseous agents. It is, however, much simpler to conduct liquid fuel and/or oxidizing agent to the electrodes together with the electrolyte than to perform with gaseous agents. However, care must be taken to prevent contact of the fuel electrode with the oxidizing agent and of the oxygen electrode with the fuel because otherwise the oxidizing agent will polarize the anode and the reducing agent will polarize the cathode, so that the fuel cell will have a lower efficiency.

It is known to prevent reactant from contacting the electrode opposite that desired hereinafter named the "counter electrode" and causing a drop in potential, by providing separators between the two electrodes. It has been suggested to use ion exchange agents as separator material, e.g. a membrane that does not function as an electrode. Such ion exchange agents may contain specific catalysts which are capable to inactivate the fuel and/or oxidizing agent with respect to the counter electrode. The separators should be permeable at least to the electrolyte solution, and possess a very low ohmic resistance in order not to limit cell voltage at useful current outputs. Moreover, an ideal separator of this type should be able to prevent intermixing of the dissolved or suspended fuel and/or oxidizing agent contacting each other, as well as their decomposition products. It has also been attempted to prevent the fuel from contacting the oxygen electrode by using a porous barrier which prevents the backflow of fuel to that electrode. Yet all of these methods and devices have some series shortcoming.

It is one object of the present invention to provide means for preventing the undesired diffusion in electrochemical devices of reactants contained in the electrolyte.

Another object of the present invention is to provide a simple and effective method of preventing and suppressing such diffusion.

Another object is to increase the efficiency of electrochemical conversion in minimizing reactions that proceed without production of electrical energy.

Another object is to prevent diffusion and reaction of a reactant at the counter electrode without the necessity of providing a physical barrier to accomplish that end.

Other objects of the present invention will become apparent as the description proceeds.

According to the present invention the diffusion of reactant to the counter electrode is prevented by forcing electrolyte which does contain an insignificant amount of the reactant in the direction opposite to the preferred direction in which the undesired diffusion of the reactant would take place. Accordingly, electrolyte is caused to flow out of the electrode electrolyte space where the reactant is undesired and into the space where the reactant is desired or where it cannot cause any undesired reactions. The electrolyte space or area in which the reactant is undesired is used as a source of fresh electrolyte which flows therefrom to the counter electrolyte space and/or to suitable outlet means. The two electrolyte spaces may, but need not, be physically separated by a barrier.

The objects of the invention will be more readily understood from the following detailed discussion.

Figure 5:
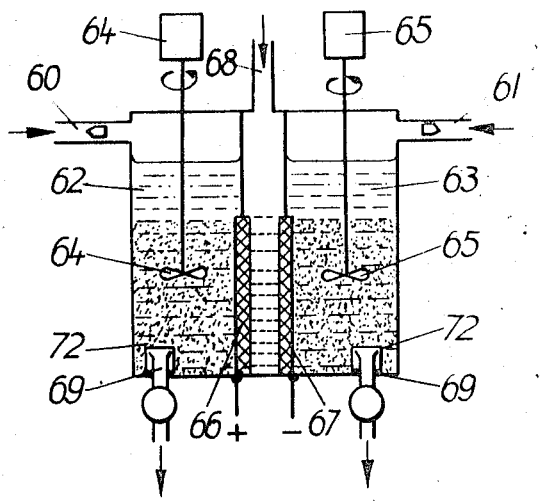
Figure 6:
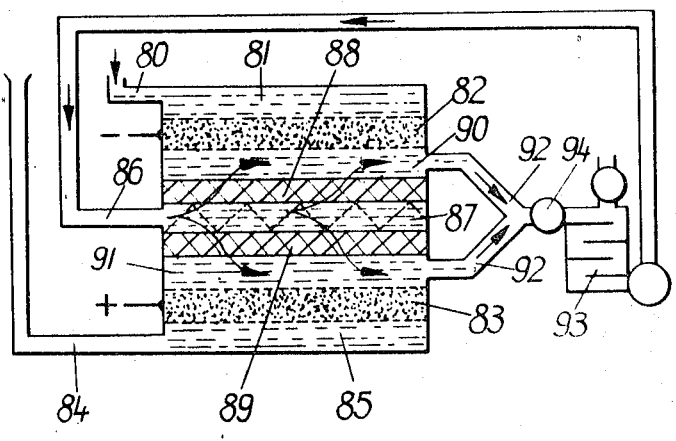
Figure 7:
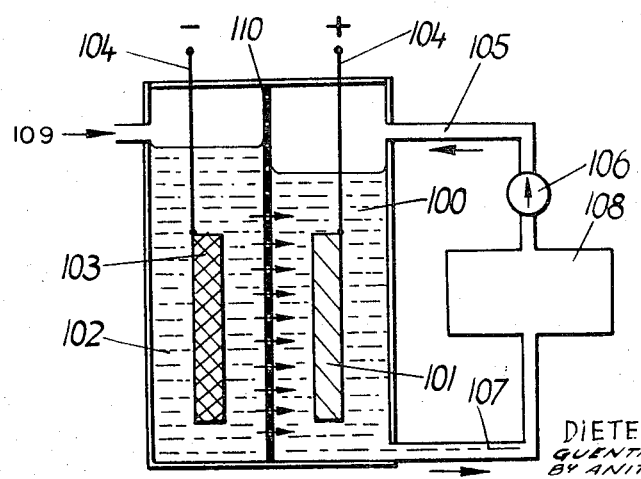
Figure 8:
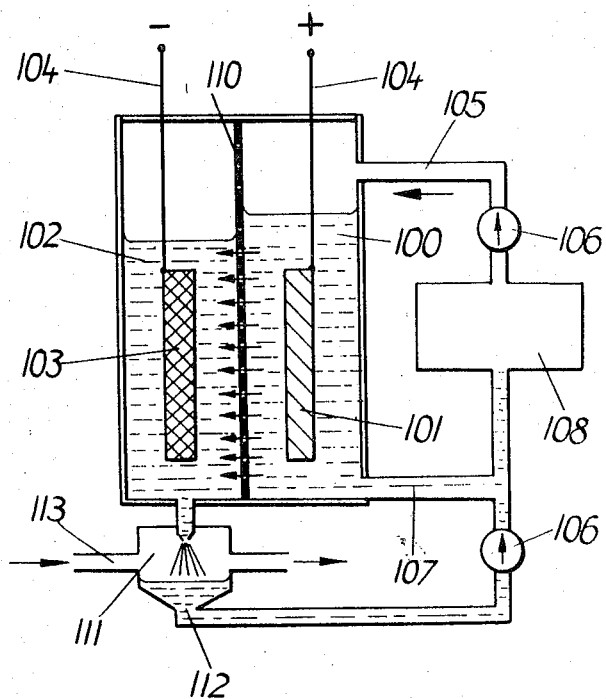
Figure 9:
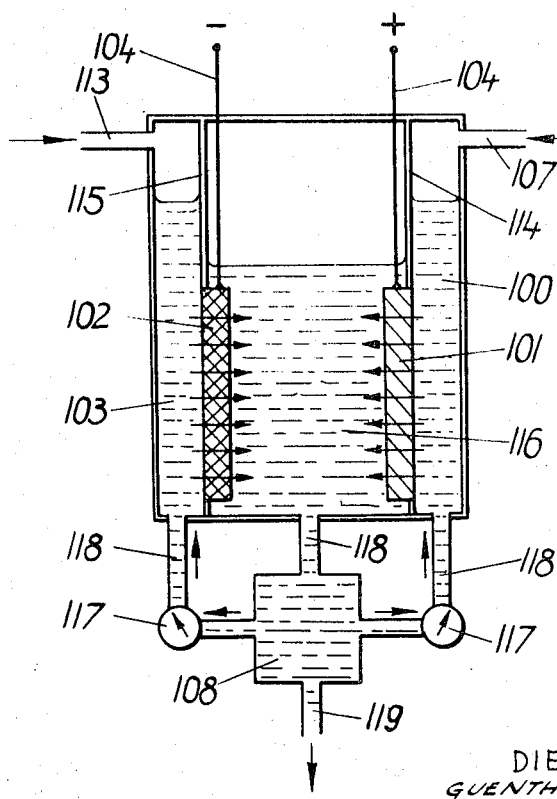

FIGS. 6, 7, and 8 are other schematic diagrams showing the device of the invention for use with dissolved reactants;

FIG. 4 shows a schematic diagram of the device of the invention using a liquid fuel and a gaseous oxidizing agent;

FIG. 5 shows an arrangement of the invention using catalyst suspension electrodes;

FIGS. 3 and 9 show another schematic diagram of the device of the invention without a physical barrier between the fuel and oxygen electrode zones.

In the figures like parts are shown by like numerals.

Figure 1:
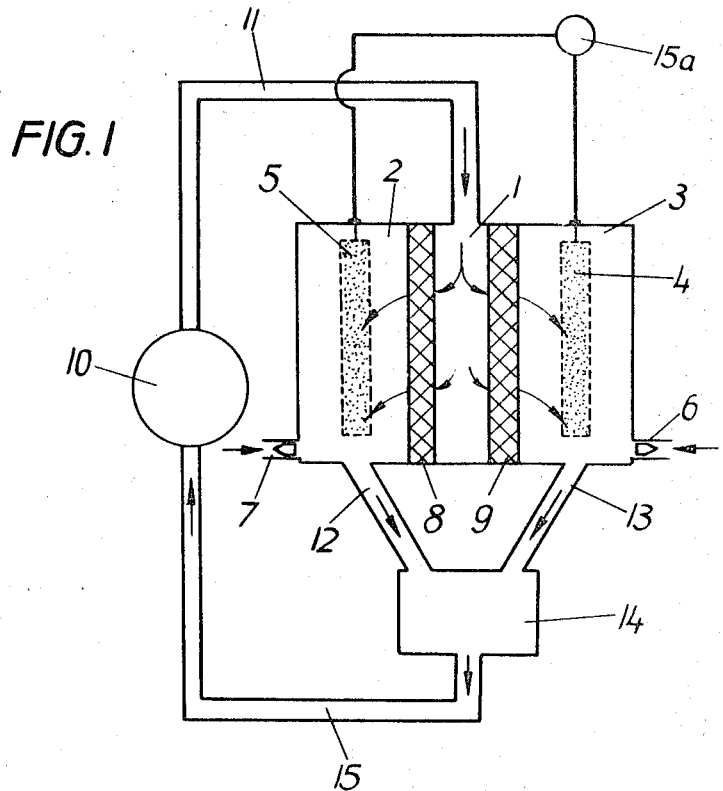
FIG. 1 is a schematic diagram of an embodiment of the invention showing a fuel cell using hydrogen as the fuel and oxygen as the oxidizing agent.

Referring now to FIG. 1, there is shown for illustrative purposes the cross section of a portion of a fuel cell for the electrochemical use of hydrogen and oxygen, showing chambers 1, 2 and 3 in which 1 contains electrolyte (regenerated or fresh), 2 contains the dissolved oxygen, and 3 contains the dissolved hydrogen; 4 illustrates the hydrogen, or fuel electrode, and 5 the oxygen or cathode. Through inlet 6 hydrogen is fed into the anode chamber. Through inlet 2 the oxygen gas is fed into the cathode chamber 2 in which there is provided the oxygen electrode 5. The chambers 2 and 3 are separated from chamber 1 by means of porous walls 8 and 9. Pump 10 provides fresh electrolyte through inlet 11 into the electrolyte chamber 1. Through outlet 12 from chamber 2 and outlet 13 from chamber 3 the electrolyte solution is fed into a regeneration chamber 14 to allow for the separation of dissolved gases, e.g. hydrogen and other undesirable components, the purified electrolyte being returned through outlet 15 to pump 10 to be reintroduced into the cycle. There is provided a suitable electric current tap at 15a. In this manner, by maintaining a positive pressure in chamber 1 through the separator walls 8 and 9 and into chambers 2 and 3, respectively, there is effectively prevented the flow of gas, oxygen and hydrogen, respectively, from the respective chambers to the opposite or counter electrode, each electrode playing the role of a source of electrolyte that carries away the products of reaction formed at the electrode.

Figure 2:
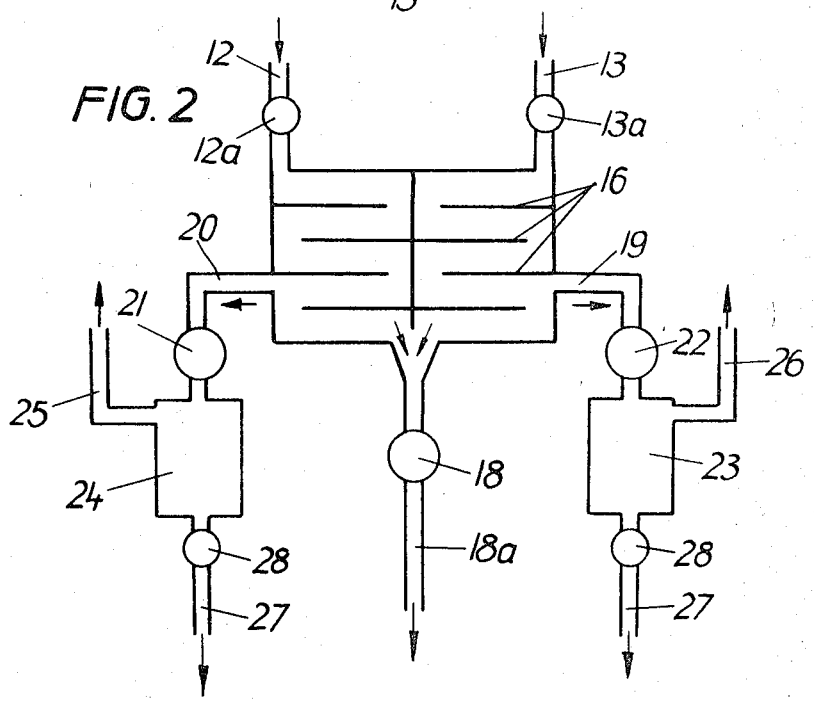
FIG. 2 shows a schematic detailed diagram of a regeneration chamber for products of reaction that are separated from the electrolyte and fuel.

Referring now to FIG. 2, there is shown in detail regeneration chamber 14 in which through inlets 12 and 13 the electrolyte solution is fed into the chamber through valves 12a and 13a, respectively. As a result of the pressure drop, the solubility of the gas in the electrolyte is decreased. The electrolyte runs over plate 16 through outlet 17 into pump 18 and then through outlet 18a. The gases are collected through outlets 19 and 20 and fed into chambers 23 and 24 and outwardly at 25 and 26. In chambers 23 and 24 there is a separation of mixed gas and electrolyte which is then let out through outlets 27 flowing through valve 28.

Referring now to FIG. 3, there is shown another embodiment of the invention using liquid or solid dissolved reactants. In this embodiment there is introduced through lines 30 a hydrazine solution and through 31 hydrogen peroxide solution into the mixing chambers 32 and 33, respectively, and then fed into the fuel electrode chamber 35 and oxygen electrode chamber 36, respectively. The electrolyte flows from chamber 35 through a porous electrode 37 into an intermediate chamber 39, and from chamber 36 through the porous electrode 38 into intermediate chamber 40. The porous separating wall 41 on one side and the porous wall 42 on the other side define the central electrolyte chamber 43. Through valve 44 and outlet 45 the electrolyte is fed into a regeneration device, and then reintroduced through inlets 46 into the recycling of the electrolyte.

The current of electrolyte through the fuel electrode and through the oxygen electrode into the chamber separating them is so maintained as to prevent a current flow from that chamber towards either one or both of these electrodes. In this illustrated embodiment of the invention, in contrast of that illustrated in FIG. 1, the electrodes are positioned within and define the middle electrolyte chamber and the electrolyte current flows through these electrodes and then outwardly from the middle chamber. There is no physical separation as by a porous barrier between the two electrodes.

Referring now to FIG. 4, there is shown an embodiment of the invention in which a fuel cell is supplied with sodium boronate as the fuel and oxygen as the oxidizing agent. There is provided a fuel electrode 44 which is porous and an oxygen electrode 45 which has a working layer 46 and a cover layer 47. By means of inlet 48 and pump 49 there is introduced fresh electrolyte into chamber 50 which then flows through the porous wall 51 and then into chamber 52, through porous electrode 44 into collecting chamber 53, and then outwardly through line 54, through valve 55 into regenerator 56. The oxygen is introduced through line 57 into the gas chamber 45 behind the working layer of the oxygen electrode. The sodium boronate solution is introduced through line 58 through valve 59 into fuel electrode chamber 52. The flow of the electrolyte is shown by the arrows. If desired wall 51 may be omitted.

Referring now to FIG. 5, there is shown a fuel cell in which both electrodes are provided as catalyst suspension electrodes and the reactants are supplied as hydrogen and oxygen. Hydrogen gas and oxygen gas are fed through inlets 60 and 61, respectively, into the fuel cell compartment 62 and the oxygen electrode compartment 63 in which there is suspended a suitable catalyst for hydrogen and for oxygen. The catalyst particles are kept in suspension in their respective electrolyte chambers by means of stirrers 64 and 65 and in contact with the metal coated surface of the porous walls 66 and 67, the surface of these walls serving as electrical conducts. Through inlet 68 there is introduced electrolyte into the space between the two porous separating walls 66 and 67, the electrolyte flowing through the walls into chambers 62 and 63. Through outlets 69 which are covered with perforated lid 72, or other suitable means, to prevent the loss of catalytic particles through the outlet, the electrolyte is separated. In this manner the diffusion of electrolyte and products from chambers 62 to 63, and vice versa, is effectively prevented by the current flow of electrolyte introduced between the two electrolytic chambers and separated in each one of these therefrom.

Referring now to FIG. 6 which in another embodiment of the invention shows a fuel cell with catalyst sieve electrodes and a fuel dissolved in the electrolyte. Electrolyte having dissolved the methanol therein as a fuel is fed into line 80 into chamber 81 and supplied to the fuel cell electrode 82. The electrolyte solution permeates and passes through the fuel cell sieve electrode 82 and thereby the methanol fuel is electrochemically converted to electrical energy. Through inlet 84 there is provided electrolyte having dissolved therein hydrogen peroxide as the oxidation reactant; the electrolyte is fed into chamber 85 and through the catalytic sieve into oxygen silver-coated nickel particle electrode 83. The electrolyte which in this case is 6 normal potassium hydroxide is passed through the electrode into chamber 91. For the reactants in chambers 91 and 90 to be kept separate from each other, there is introduced through inlet 86 fresh electrolyte into the compartment 87 positioned between two porous walls which allow the flow of the electrolyte to proceed from chamber 87 into chambers 90 and 91, respectively. From there the electrolyte, together with the used electrolyte, flows from these chambers through outlet 92 into a regeneration apparatus 93 through a system of valves 94.

In this manner, by creating a positive electrolyte flow from the area adjacent the respective electrodes to suitable outlet means which keeps the reactants separate, there is prevented side reaction at the counter electrode. The electrolyte solution after use is prevented from proceeding from the anode to the cathode areas and vice versa.

Referring now to FIG. 7, there is shown another embodiment of the invention in which the fuel cell compartment 100 is provided with a fuel, methanol, and the fuel cell electrode 101 and compartment 102 are provided with the oxidizing agent, a hydrogen peroxide solution, and the cathode 103. The electrodes are connected by connectors 104. The fuel cell compartment is provided by supply line 105 passing over pump 106 and the electrolyte solution after use is removed at 107 and directed to the separator 108. Fresh electrolyte supply is provided at 109 and also through line 105. A pressure differential in flow of electrolyte is maintained to create a positive pressure across the porous separator wall 110 which divides the fuel cell from the oxygen electrode. In this manner there is created a positive current flow from the oxygen electrode to the fuel electrode with removal of the products at the area in the vicinity of the fuel cell electrode. The electrodes and their respective supply can be reversed in position with respect to each other, thereby removing the electrolyte at the oxygen electrode.

FIG. 8 is a similar embodiment of the invention where the positive pressure and flow are maintained from the fuel cell compartment towards and into the oxygen electrode compartment, the effluent electrolyte being removed from the area in the vicinity of the oxygen electrode passed out into receiver 111 and then through line 112 is mixed again with the effluent electrolyte from the fuel cell compartment, fresh electrolyte being added at line 113.

Referring now to FIG. 9 which illustrates a preferred embodiment of the invention, there is shown a fuel cell arrangement without separator wall similar to that shown in FIG. 3. The fuel electrode 101, which is porous, serves as the electrolyte source which is supplied from area 100 and line 114; likewise a porous oxygen electrode 102 is supplied with the oxidizing agent from compartment 103 and line of supply 115. The fuel cell compartment 100 and the oxygen electrode compartment 103 are also supplied respectively with fresh electrolyte through lines 118, and with fuel and fresh oxidizing agent through lines 107 and 113 respectively. A positive pressure is maintained from compartment 100 into and through the porous electrode into a central compartment 116 adjacent both electrodes, and a positive pressure is maintained from compartment 103 through the porous cathode into the central compartment 116. Effluent electrolyte with the mixed reaction products is taken off at line 118 into separator 108, the reaction product effluent leaving at 119 and fersh electrolyte being pumped up through pumps 117 through lines 118 into the respective compartments. The different porosities of the fuel cell electrode and oxygen electrode respectively can be compensated for, if it is desired to have an even pressure differential between the respective outer compartments of each electrode and the central compartment, by regulating the amount of electrolyte provided into the outer fuel cell compartment 100 and the outer oxygen compartment 103. Alternatively, different current velocities from the respective outer electrode compartments to the central compartment can be made to prevail with electrodes of different porosities and maintaining same electrolyte supply at each electrode. Instead of two liquid reactants at least one of them may be gaseous, e.g. as illustrated in FIG. 4, with a suitable electrode.

As is evident from the above illustrations, in accordance with the invention, the process comprises maintaining in a system for converting electrochemically an organic reaction fuel in an electrolyte, a liquid current of electrolyte against the diffusion of the compounds which do not produce electrical energy, such as the reactants at counter electrode (e.g. the fuel at the oxygen electrode or the oxidizing compound at the fuel electrode) or the products of the reaction, to prevent their reaction at the opposite electrode without producing electrical energy. Either one of these steps can be carried out: the fuel may be prevented from reaching the oxygen electrode and vice versa or the reaction products may be prevented from reaching the counter electrode from that at which they were formed; or all of these steps can be performed together in accordance with the invention. The electrolyte current is particularly effective when it is made to originate from the vicinity of at least one of the electrodes in the system. The term vicinity means, herein, that the electrolyte permeates the electrode from one of its surfaces and flows out from another; or the electrolyte may be supplied into the electrode, then flow out from at least one of its surfaces into a chamber. The current of electrolyte can be maintained by supplying from the vicinity of a first electrode an excess of electrolyte and outlet means for removing the used electrolyte from the vicinity of the electrode. In this manner a current is created from the area of the first electrode to an area removed therefrom, the current carrying the undesirable products or reactants.

In one aspect of the invention, one or more porous electrodes in the system serve as a source for the electrolyte, the electrolyte being fed into the electrode spaces and made to flow out of the electrode by the use of pressure. The electrode may also serve, if desired, as a porous portion of a wall which separates an area of electrolyte which is adjacent a wall of the electrode from the remaining electrolyte which is adjacent the other wall. The electrolyte is provided in the vicinity of the electrode; the directios of the flow of electrolyte current is maintained away from the electrode, through suitable outlet means, and towards and out from the vicinity of the electrode.

In another aspect of the invention, the various areas containing electrolyte are in communication with each other. The area containing electrolyte adjacent one side of the electrode is in communication with the area which contains the remaining electrolyte. This arrangement promotes efficient utilization of the electrolyte by limiting the volume in circulation. A like purpose is accomplished by providing the system with at least one wall which is at least partially porous and limits one or both areas in the vicinity of the electrode.

In accordance with the invention, the outlet means for the electrolyte may be located in an area situated in the vicinity of or behind the first electrode, the current of electrolyte carries the reaction products from the area in the vicinity of the second electrode to the vicinity of the first electrode; the outflowing electrolyte contains both products of the reaction. The reaction products of the second electrode in the electrolyte mixture are prevented from penetrating into the first electrode, and thereby contacting its reactive centers and cause undesirable reaction, by maintaining an electrolyte flow from the first electrode outwardly, thus using it too as an electrolyte source. The flow of electrolyte from each electrode is suitably adjusted to promote the flow of the electrolyte containing the mixed reaction products while avoiding reaction at the first electrode as, for instance, by maintaining a differential in velocity of each of the current flows.

In other arrangements of the invention, the outlet means may be situated between the two electrodes. Likewise, the supply means may be located between the two electrodes or behind one or both of them, or both of these arrangements may be made concurrently. One or more porous walls may be used in the system to maintain the electrode in separate, but yet communicating electrolyte chambers, or such porous walls may be used in the area behind the electrodes, which are then in the same electrolyte compartment. In a highly advantageous system of the invention the area common to both electrodes is free of divider, porous or not, between the electrodes.

Known porous membranes may be used, their pore diameter may vary as needed, e.g. in the range of $0.05\mu$ to $100\mu$, generally $1\mu$ to about $50\mu$; pore diameter to pore length is generally selected in the range of 1:70 to 1:100.

The particular arrangement selected (number of chambers, location of supply and outlet means) depends on on the nature of the fuel and oxidizing agent, whether they are e.g. gaseous or liquids and the manner of supplying the catalyst e.g. in suspension or not.

In accordance with the the invention, the current of the electrolyte can be maintained by increasing pressure on the supply of electrolyte or by decreasing the pressure (e.g. applying suction) at the opposite end—the outlet means of the system. It is desirable to maintain the electrolyte current at such a rate that the volume in the system is kept substantially constant, thereby replacing electrolyte at the same rate as undesirable reaction products are being removed.

While of course one skilled in the art can devise from the teachings of this invention the most desirable embodiment needed for the intended purposes, the following formula is of help adjusting the speed of electrolyte flow and determine the pressure differential in the system.

$$\frac{D}{\delta} \leq \frac{q}{q_D} \cdot \frac{N_\pi r_D^4 \cdot \Delta p}{8\eta \cdot \delta}$$

in which:

D indicates the diffusion coefficient,
$\delta$ indicates the thickness of the optional separator through which the electrolyte flows,
$q_D$ indicates the pore cross section of the electrode,
N indicates the number of pores per unit of area,
$r_D$ indicates the pore radius,
$\Delta p$ indicates the difference in pressure along $\delta$, and
$\eta$ indicates the viscosity of the electrolyte.

This formula is derived from reference to the Hagen and Poiseuille law, and the first Fick law.

The active components of the electrodes, e.g. the catalysts, the oxidants, the organic fuels, the electrolytes are known, e.g. as described in Fuel Cell Systems, Advances in Chemistry Series 47 (1965) American Chemical Society, Ed. Robert F. Gould, and need not be described further here since the invention as described provides a novel and more efficient process and apparatus for converting chemical energy into electrical energy.

We claim:

1. The process for producing electrical energy by an electrochemical process in a fuel cell which comprises a fuel gas diffusion electrode and an oxygen electrode, a pair of walls porous to the passage of electrolyte positioned in said fuel cell defining an electrolyte chamber therebetween and positioned between said electrodes, the process which comprises supplying only a single stream of electrolyte into said electrolyte chamber while supplying gaseous reactant to the gas diffusion electrode, then flowing said electrolyte from said electrolyte chamber through said porous walls into the chambers where the electrodes are positioned while supplying another electrochemically convertible reactant in electrolyte to the chamber where the oxygen electrode is positioned and removing outwardly from said fuel cell substantially all the electrolyte only from the chambers where the electrodes are positioned.

2. The process of claim 1 wherein one of the reactants is hydrogen and the other is oxygen.

3. The process of claim 1 wherein the fuel is sodium boranate and the oxidant is oxygen.

4. The process of claim 1 wherein the reactants are either a solid suspended in the electrolyte or a liquid therein.

5. The process of claim 1 wherein the effluent spent electrolyte is regenerated and circulated to be resupplied to the electrolyte chamber.

6. The process for producing electrical energy by an electrochemical process in a fuel cell which comprises an electrolyte chamber positioned between two electrode chambers wherein a fuel and oxygen electrode are positioned respectively, the electrolyte chamber being separated from each electrode chamber by a porous wall, and being free of a membrane separating the chamber partially or completely into separate compartments, said chambers containing electrolyte and an organic fuel electrochemically convertible, the process comprising supplying a flow of electrolyte into the electrolyte chamber, flowing a portion of said electrolyte from the electrolyte chamber into one of the electrode chambers, flowing another portion of said electrolyte from the electrolyte chamber into the other electrode chamber, and removing substantially all the electrolyte only from said respective electrode chambers.

7. The process of claim 6 which comprises supplying a flow of an electrochemically convertible reactant in electrolyte to the chamber in which the fuel and oxygen electrodes are respectively positioned, flowing said reactant-containing electrolyte through said respective electrodes and flowing the electrolyte outwardly from said chambers.

8. The process of claim 7 wherein the portions of the electrolyte flowing out of each electrode chamber are fed into a common chamber.

9. The process of claim 7 which takes place while the flow of electrolyte is maintained from the electrolyte chamber through the porous separation wall into the electrode chambers and outwardly therefrom.

10. The process of claim 6 wherein at least one of the electrode chambers contains a catalyst in suspension in the electrolyte.

11. The process of claim 10 wherein each one of the two electrolyte chambers through which the electrolyte flows contains catalyst in suspension in the electrolyte.

12. The process of claim 6 wherein the electrolyte chamber is free of a membrane separating the chamber partially or completely into two sections.

13. The process of claim 6 which comprises feeding an electrochemically convertible reactant in electrolyte to the fuel electrode, another electrochemically convertible reactant to the oxygen electrode, passing each of said electrolyte through the fuel and oxygen electrodes, respectively into an electrolyte compartment and flowing said electrolyte, together with the electrolyte flowing from the electrolyte chamber, outwardly from said respective chambers.

14. The process of claim 13 wherein the fuel is methanol.

15. The process of claim 13 wherein the oxidant is hydrogen peroxide.

References Cited

UNITED STATES PATENTS

| | | | |
|---|---|---|---|
| 3,098,768 | 7/1963 | Titterington et al. | 136—86 |
| 3,234,562 | 2/1966 | Bell et al. | |
| 3,178,315 | 4/1965 | Worsham | 136—86 |
| 3,188,241 | 6/1965 | Weiss et al. | 136—86 |
| 3,227,585 | 1/1966 | Langford et al. | 136—86 |
| 3,294,588 | 12/1966 | Beltzer et al. | 136—86 |
| 3,375,139 | 3/1968 | Tschinkel et al. | 136—86 |
| 2,969,315 | 1/1961 | Bacon | 136—86 X |
| 3,135,673 | 6/1964 | Tirrel et al. | 204—263 X |
| 3,222,267 | 12/1965 | Tirrell et al. | 204—263 X |
| 3,338,747 | 8/1967 | Plust et al. | 136—86 |

FOREIGN PATENTS 1,011,076 11/1965 Great Britain.

ALLEN B. CURTIS, Primary Examiner